(12) United States Patent
Iseki et al.

(10) Patent No.: US 7,300,592 B2
(45) Date of Patent: Nov. 27, 2007

(54) WATER TREATMENT DEVICE

(75) Inventors: Masahiro Iseki, Kumagaya (JP); Atsushi Yamada, Kiryu (JP); Hiroyuki Umezawa, Ota (JP); Tomohito Koizumi, Ota (JP); Yui Ogawa, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/500,898

(22) Filed: Aug. 9, 2006

(65) Prior Publication Data

US 2007/0034567 A1    Feb. 15, 2007

(30) Foreign Application Priority Data

Aug. 9, 2005  (JP) ............... 2005-230616
Feb. 28, 2006  (JP) ............... 2006-053424

(51) Int. Cl.
  *C02F 3/00* (2006.01)
(52) U.S. Cl. .................................... 210/748
(58) Field of Classification Search ............... 210/748, 210/601

See application file for complete search history.

(56) References Cited

U.S. PATENT DOCUMENTS

| | | | | |
|---|---|---|---|---|
| 3,336,220 A | * | 8/1967 | Neidl | 210/603 |
| 4,090,940 A | * | 5/1978 | Switzgable | 204/278 |
| 4,124,481 A | * | 11/1978 | Ramer | 204/278 |
| 6,638,427 B2 | * | 10/2003 | Yamasaki et al. | 210/605 |
| 6,984,326 B2 | * | 1/2006 | Iseki et al. | 210/631 |
| 7,175,765 B2 | * | 2/2007 | Yamada et al. | 210/615 |
| 2005/0194310 A1 | * | 9/2005 | Yamamoto et al. | 210/605 |
| 2005/0194311 A1 | * | 9/2005 | Rozich | 210/614 |

FOREIGN PATENT DOCUMENTS

| | | |
|---|---|---|
| JP | 54-016844 | 2/1979 |
| JP | 2004-122032 | 4/2004 |
| JP | 2004-330182 | 11/2004 |

\* cited by examiner

*Primary Examiner*—Chester T. Barry
(74) *Attorney, Agent, or Firm*—McDermott Will & Emery LLP

(57) ABSTRACT

An object is to provide a water treatment device which can treat for-treatment water containing fluorine components into a state adaptable to the environment and which can treat nitrogen compounds without influencing a concentration of the for-treatment water containing the nitrogen compounds. The water treatment device includes: a fluorine content removing unit to separate a substance to be removed from the for-treatment water in which the substance to be removed including a fluorine content is mixed; an electrochemical treatment unit including at least a pair of electrodes submerged at least partially in the for-treatment water, from which the substance to be removed has been separated, to perform a treatment by an electrochemical technique; and a biological treatment unit which biologically treats the water treated by the electrochemical technique.

8 Claims, 6 Drawing Sheets

WATER TREATMENT DEVICE

BACKGROUND OF THE INVENTION

1. Field of the Invention

The present invention relates to a treatment device of water to be treated (hereinafter referred to as "for-treatment water") containing a fluorine content or for-treatment water containing nitrogen compounds and the like discharged from, for example, a semiconductor plant or the like.

2. Description of the Related Art

Heretofore, it is well known that one of causes for eutrophication of rivers and lake is the presence of nitrogen compounds. A large amount of the nitrogen compounds exist in waste water such as general household domestic waste water or plant waste water, but it is difficult to purify the water, and an effective measure cannot be taken in the present situation.

In general, as a treatment of the nitrogen compounds, an aerobic, anaerobic and biological treatment is performed, and this treatment is performed by two steps of a nitrification step of converting ammonia nitrogen into nitrite nitrogen, and further converting nitrite nitrogen into nitrate nitrogen, and a denitrification step of converting nitrate nitrogen into a nitrogen gas. Therefore, two reaction tanks are required and a treatment time is long, and hence, there is a problem that a treatment efficiency drops. Especially, since a reaction efficiency of the nitrification step of oxidizing ammonia to form nitrate nitrogen is low, a large reaction tank is required.

To solve the problem, during the treatment of the nitrogen compounds, an electrolysis treatment is performed in which a noble metal material such as platinum, iridium or palladium is used for an anode, and a current is applied to waste water as a treatment object to treat ammonia nitrogen, nitrite nitrogen and nitrate nitrogen in the waste water into the nitrogen gas (e.g., see Japanese Patent Application Laid-Open No. 54-16844).

However, in a case where for-treatment water containing highly concentrated nitrogen compounds is treated, there is a problem that enormous power cost is required. Therefore, when the for-treatment water containing the highly concentrated nitrogen compounds is reduced down to the nitrogen gas by the electrolysis treatment only, there is a problem that a remarkable cost burden is imposed.

To solve the problem, examples of a conventional device to treat the for-treatment water containing the nitrogen compounds include water treatment devices described in Japanese Patent Application Laid-Open Nos. 2004-330182 and 2004-122032. Each of these water treatment devices includes electrolysis treatment means and biological treatment means, and the water treated by the electrolysis treatment means is further treated by the biological treatment means to thereby effectively treat the nitrogen compounds remaining in the treated water. In consequence, it is possible to suppress a cost rise caused in the case of treating the water by the electrolysis treatment only. Moreover, it is possible to prevent a treatment efficiency drop from being caused in the case of treating the water by the biological treatment means only.

On the other hand, examples of the for-treatment water containing the nitrogen compounds as described above include hydrofluoric acid waste water discharged from a semiconductor manufacturing plant and the like. The hydrofluoric acid waste water is waste water containing hydrofluoric acid used in an etching step of a semiconductor manufacturing process, hydrofluoric acid is referred to as buffered hydrofluoric acid, and besides hydrofluoric acid, a highly concentrated hydrofluoric acid solution is used which is prepared using ammonium fluoride, nitric acid, a hydrogen peroxide solution or the like with a predetermined concentration.

Therefore, such a hydrofluoric acid solution containing the highly concentrated nitrogen compounds has a problem that the waste water containing hydrofluoric acid cannot be treated by the water treatment device only in which the electrolysis treatment and the biological treatment are combined to treat the nitrogen compounds as described above. Since the waste water containing hydrofluoric acid cannot be released to the environment as it is, the waste water has to be treated as an industrial waste. This is regarded as an important problem in respect of not only environment adaptability but also treatment cost.

Moreover, in each of the water treatment devices described above, after the electrolysis treatment is performed, the biological treatment is performed. In the biological treatment, a large single tank contains therein heterotrophic bacteria to reduce nitrate nitrogen or nitrite nitrogen into the nitrogen gas. The electrolytically treated water is fed to the tank to thereby reduce nitrate nitrogen or nitrite nitrogen remaining in the treated water. In this case, even as to the electrolytically treated water, the concentration of the nitrogen compounds in the treated water largely fluctuates with the concentration of the nitrogen compounds in raw water, that is, waste water. Therefore, in accordance with the concentration of the for-treatment water, the fluctuation of a load enlarges with respect to the bacteria in the tank for use in the biological treatment. Especially, in a case where as compared with the concentration of the nitrogen compounds in the treated water at the end of the previous treatment, the nitrogen compound concentration of the next treatment is remarkably high, a state of the load on the bacteria largely fluctuates. When this results in an overload state with respect to the bacteria, the drop of the treatment efficiently is incurred.

Therefore, the present invention has been developed to solve the conventional technical problems, and a water treatment device is provided which can treat for-treatment water containing fluorine components to bring the water into a state adaptable to the environment. The device can also treat nitrogen compounds without being influenced by a concentration or an amount of for-treatment water containing the nitrogen compounds.

SUMMARY OF THE INVENTION

In a first aspect of the present invention, a water treatment device comprises: a fluorine content removing unit to separate a substance to be removed from for-treatment water in which the substance to be removed including a fluorine content is mixed; an electrochemical treatment unit in which at least a pair of electrodes is submerged at least partially in the for-treatment water to perform a treatment by an electrochemical technique; and a biological treatment unit which biologically treats the for-treatment water.

In a second aspect of the present invention, a water treatment device comprises: an electrochemical treatment unit in which at least a pair of electrodes is submerged at least partially in the for-treatment water to perform a treatment by an electrochemical technique; and a biological treatment unit which has a plurality of biological treatment tanks and which biologically treats the water treated by the electrochemical technique, the number of the biological treatment tanks is switched based on a concentration of nitric acid in the for-treatment water and/or an amount of the for-treatment water.

In the water treatment device of a third aspect of the present invention, in the above inventions, the electrochemical treatment unit has pH adjustment means for adjusting a pH of the for-treatment water during the treatment by the electrochemical technique; pH detection means for detecting the pH of the for-treatment water; ORP detection means for detecting an oxidation reduction potential of the for-treatment water; end judgment means for judging the end of the treatment by the electrochemical technique; and control means for controlling conduction of electricity to the electrodes, the pH of the for-treatment water is adjusted into a predetermined range by the pH adjustment means during the treatment by the electrochemical technique, the end judgment means judges the end based on a detection output of the pH detection means and/or an detection output of the ORP detection means, and the control means ends the electricity conduction to the electrodes in response to this judgment output.

In the water treatment device of a fourth aspect of the present invention, in the above invention, the electrochemical treatment unit has hypohalogenous acid reduction treatment means for reducing hypohalogenous acid in the for-treatment water; and reduction treatment end judgment means for judging the end of a reduction treatment of hypohalogenous acid, after the end of the electricity conduction to the electrodes by the control means, the hypohalogenous acid reduction treatment means performs the reduction treatment of hypohalogenous acid, and the reduction treatment end judgment means judges the end of the reduction treatment to end an operation of the hypohalogenous acid reduction treatment means, when the output of the ORP detection means is not more than a predetermined value.

In the water treatment device of a fifth aspect of the present invention, in the above third aspect of the invention, the pH adjustment means adjusts the pH of the for-treatment water into a range of 5 to 8.

In a sixth aspect of the present invention, in the above inventions, the water treatment device further comprises: means for removing oxygen from the for-treatment water in a stage before the biological treatment.

In the water treatment device of a seventh aspect of the present invention, in the above inventions, the biological treatment unit treats the for-treatment water by use of granular sludge.

In an eighth aspect of the present invention, a water treatment device biologically treats for-treatment water, and comprises: a biological treatment tank which pools granular sludge, the for-treatment water being fed from the biological treatment tank to perform the biological treatment, the biological treatment tank being provided with a filter membrane therein, the for-treatment water in the biological treatment tank being allowed to flow out of the biological treatment tank via the filter membrane.

According to the first aspect of the present invention, the water treatment device includes: the fluorine content removing unit to separate the substance to be removed from the for-treatment water in which the substance to be removed including the fluorine content is mixed; the electrochemical treatment unit in which at least a pair of electrodes is submerged at least partially in the for-treatment water to perform the treatment by the electrochemical technique; and the biological treatment unit which biologically treats the for-treatment water. Therefore, in the fluorine content removing unit, it is possible to remove the fluorine content from for-treatment water containing a fluorine content and nitrogen compounds, such as hydrofluoric acid waste water discharged from, for example, a semiconductor plant. Moreover, for-treatment water containing at least nitrogen compounds can be treated in the electrochemical treatment unit and the biological treatment unit.

In consequence, it is possible to treat the waste water discharged from the plant or the like and containing the fluorine content or at least the nitrogen compounds to obtain a state suitable for the environment, cost of the waste water treatment can be reduced, and adaptability to the environment can be enhanced.

According to the second aspect of the present invention, the water treatment device includes: the electrochemical treatment unit in which at least a pair of electrodes is submerged at least partially in the for-treatment water to perform the treatment by the electrochemical technique; and the biological treatment unit which has a plurality of biological treatment tanks and which biologically treats the water treated by the electrochemical technique. The number of the biological treatment tanks is switched based on the concentration of nitric acid in the for-treatment water and/or the amount of the for-treatment water. Therefore, regardless of the concentration of the treatment object contained in the for-treatment water, that is, the concentration of the nitric acid or the amount of the for-treatment water, loads applied to the biological treatment tanks can be reduced.

In consequence, treatment efficiencies of the biological treatment tanks can be enhanced, and the whole treatment efficiency of the for-treatment water can be enhanced.

According to the water treatment device of the third aspect of the present invention, in the above inventions, the electrochemical treatment unit has the pH adjustment means for adjusting the pH of the for-treatment water during the treatment by the electrochemical technique; the pH detection means for detecting the pH of the for-treatment water; the ORP detection means for detecting the oxidation reduction potential of the for-treatment water; the end judgment means for judging the end of the treatment by the electrochemical technique; and the control means for controlling the conduction of the electricity to the electrodes. The pH of the for-treatment water is adjusted into the predetermined range by the pH adjustment means during the treatment by the electrochemical technique. Moreover, the end judgment means judges the end based on the detection output of the pH detection means and/or the detection output of the ORP detection means, and the control means ends the electricity conduction to the electrodes in response to this judgment output. Consequently, without using any expensive sensor such as an ammonia nitrogen concentration measurement unit, it is possible to exactly judge an ammonia nitrogen treatment end time in accordance with the concentration of ammonia nitrogen in the for-treatment water.

In consequence, it is possible to avoid a disadvantage that the treatment of ammonia nitrogen in the for-treatment water halfway ends, and ammonia nitrogen remains in the treated water, or a disadvantage that electrolysis is performed more than necessary to waste power consumption. Therefore, running costs can be reduced. Especially, since the electrolysis is not performed more than necessary, it is possible to suppress a disadvantage that hypohalogenous acid is excessively generated in the for-treatment water.

Especially, since the pH adjustment means adjusts the pH of the for-treatment water into the predetermined range during the treatment by the electrochemical technique, there is not any large influence on generation of intermediate products such as monochloroamine and dichloroamine in denitrification reaction of hypohalogenous acid and ammonia generated in the water treated by the electrochemical technique. Therefore, the fluctuation of the pH of the for-treatment water does not largely influence fluctuation of an oxidation reduction potential, and it is possible to judge the treatment end time of ammonia nitrogen.

According to the water treatment device of the fourth aspect of the present invention, in the above invention, the electrochemical treatment unit has the hypohalogenous acid reduction treatment means for reducing hypohalogenous acid in the for-treatment water; and reduction treatment end judgment means for judging the end of the reduction treatment of hypohalogenous acid. After the end of the electricity conduction to the electrodes by the control means, the hypohalogenous acid reduction treatment means performs the reduction treatment of hypohalogenous acid, and the reduction treatment end judgment means judges the end of the reduction treatment to end the operation of the hypohalogenous acid reduction treatment means, when the output of the ORP detection means is not more than the predetermined value. In consequence, it is possible to strictly judge the reduction treatment end time of hypohalogenous acid remaining in the treated water.

In consequence, since hypohalogenous acid in the for-treatment water can be reduced without any excess or inadequacy, it is possible to avoid an adverse affect of hypohalogenous acid in the biological treatment of the for-treatment water in a rear stage. Moreover, since the hypohalogenous acid reduction means is not wastefully used, it is possible to eliminate a disadvantage that running costs rise.

Especially, since the reduction treatment end time of hypohalogenous acid is determined based on the detection of the ORP detection means disposed in the electrochemical treatment unit. Therefore, in a case where the denitrification reaction end time of ammonia is determined based on the detection of the ORP detection means as described above, without disposing any special means for detecting hypohalogenous acid, it is possible to judge the reduction treatment end time of hypohalogenous acid.

Therefore, it is possible to suppress a disadvantage that living matters in the biological treatment tank are adversely affected by hypohalogenous acid contained in the for-treatment water to lower the treatment efficiency.

According to the water treatment device of the fifth aspect of the present invention, in the above third aspect of the invention, the pH adjustment means adjusts the pH of the for-treatment water into a range of 5 to 8. Therefore, there is not any large influence on the generation of intermediate products such as monochloroamine and dichloroamine in the denitrification reaction of hypohalogenous acid and ammonia generated in the water treated by the electrochemical technique.

Moreover, since the pH of the treated water is not set to 4 or less, it is possible to suppress a disadvantage that hypohalogenous acid such as hypochlorous acid generated in the water treated by the electrochemical technique is released as a halogen gas such as a chlorine gas in the air.

According to the sixth aspect of the present invention, in the above inventions, the water treatment device further comprises: the means for removing oxygen from the for-treatment water in the stage before the biological treatment.

According to the water treatment device of the seventh aspect of the present invention, in the above inventions, the biological treatment unit treats the for-treatment water by use of the granular sludge. In consequence, it is possible to enhance the treatment efficiency by anaerobic microorganisms for use in the biological treatment.

According to the eighth aspect of the present invention, the water treatment device biologically treats the for-treatment water, and comprises: the biological treatment tank which pools the granular sludge, the for-treatment water is fed from the biological treatment tank to perform the biological treatment, the biological treatment tank is provided with the filter membrane therein, and the for-treatment water in the biological treatment tank is allowed to flow out of the biological treatment tank via the filter membrane. In consequence, it is possible to suppress a disadvantage that the granular sludge in the biological treatment tank mixes in the for-treatment water discharged out of the biological treatment tank, and the granular sludge increases environmental loads.

DESCRIPTION OF THE PREFERRED EMBODIMENT

Figure 1:
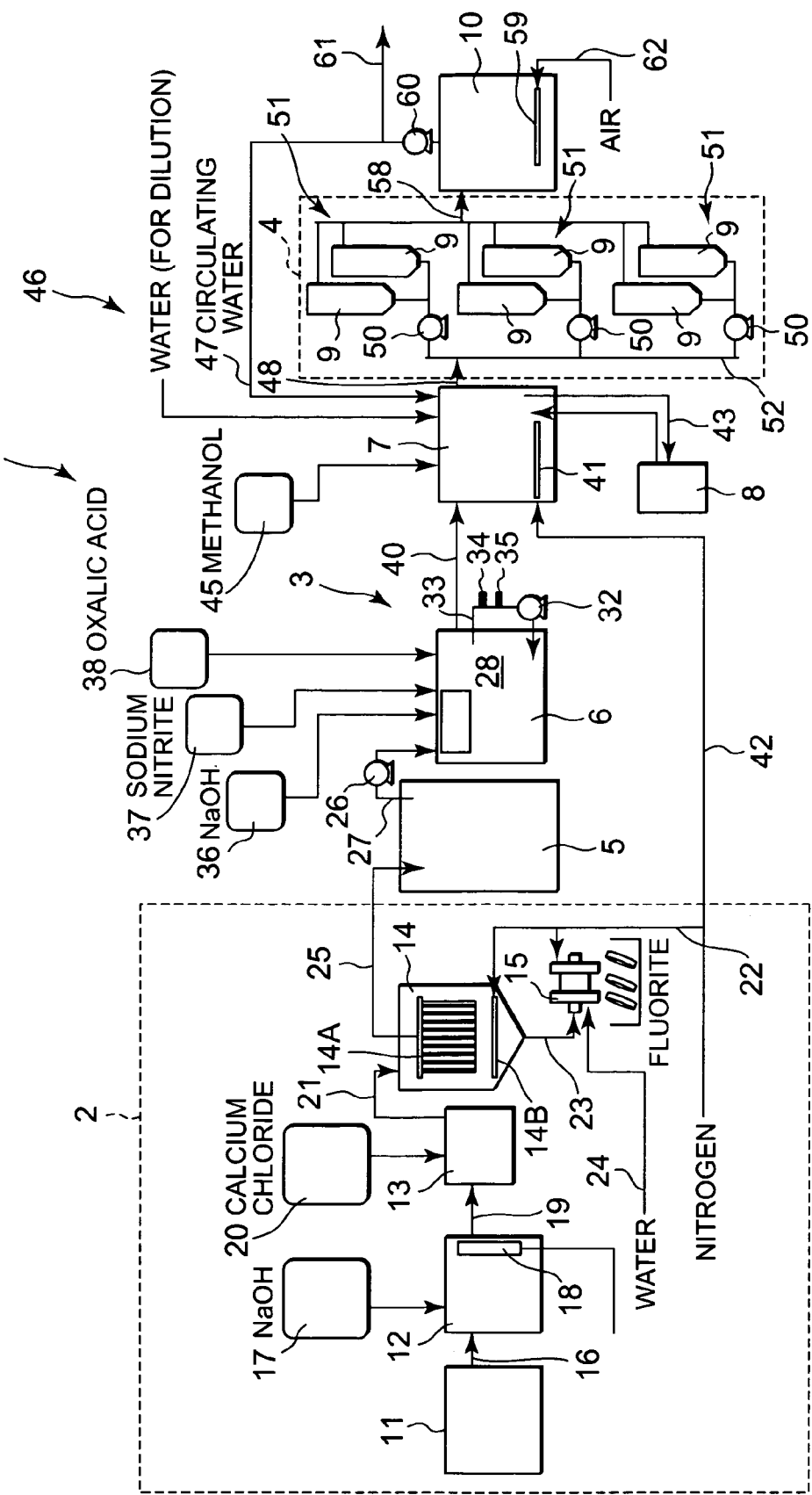
FIG. 1 is a schematic explanatory view of a water treatment device in an embodiment of the present invention.
Figure 2:
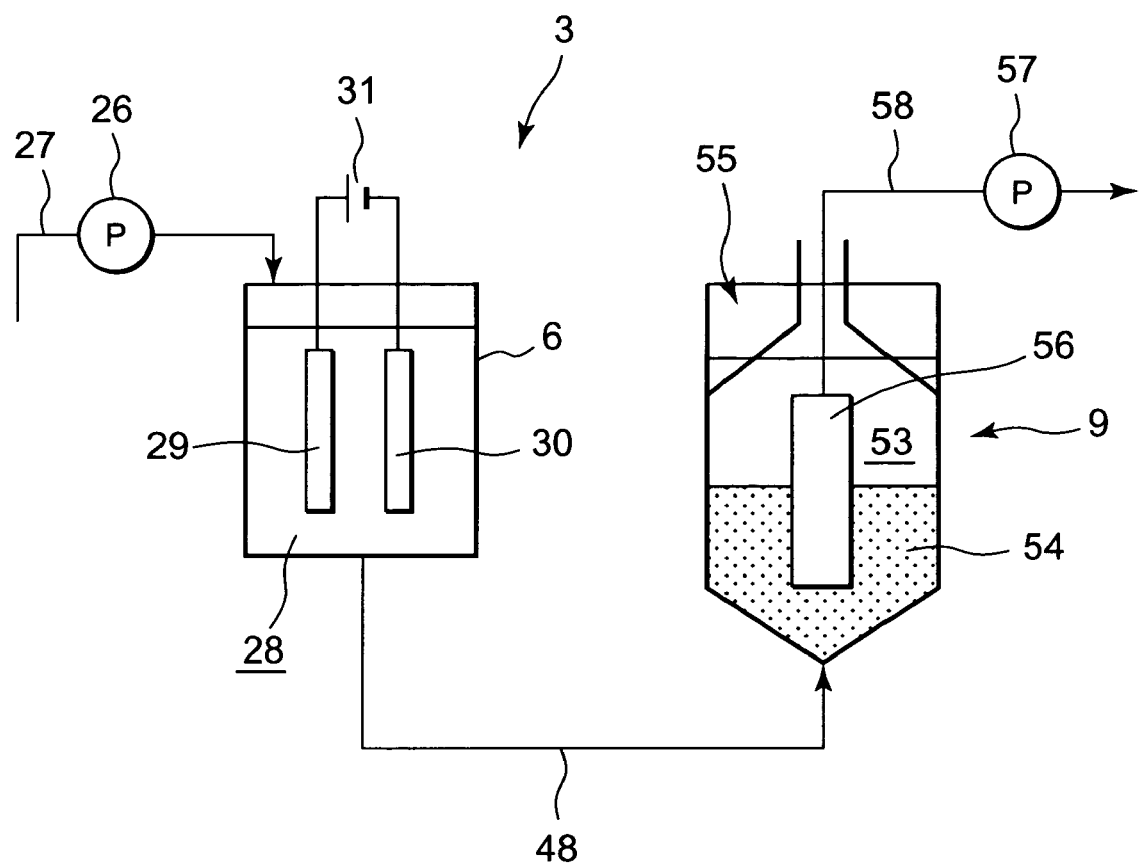
FIG. 2 is a schematic explanatory view of an electrochemical treatment unit and a biological treatment tank.

Next, embodiments of the present invention will be described with reference to the drawings. FIG. 1 is a schematic explanatory view of a water treatment device 1 which treats for-treatment water containing fluorine components and nitrogen compounds. In the present embodiment, the water treatment device 1 treats for-treatment water such as waste water containing the fluorine components for use in an etching step in a semiconductor plant. To be more specific, a large amount of waste water containing a fluorine content is discharged from a step of etching semiconductor, glass, metal or the like. In this etching step, hydrofluoric acid is used in order to improve a corrosion behavior during the etching. Here, hydrofluoric acid is so-called buffered hydrofluoric acid, and examples of hydrofluoric acid include rich hydrofluoric acid containing about 49% of hydrogen fluoride (HF), hydrofluoric acid containing fluorine components as ammonium fluoride ($NH_4HF_2$, $NH_4F$) and rich hydrofluoric acid containing hydrofluoric acid and nitric acid ($HNO_3$) at a predetermined ratio. Besides very highly hazardous hydrofluoric acid, they contain highly concentrated nitrogen compounds such as ammonia and nitric acid. Since the waste water discharged from the plant contain the highly concentrated fluorine components or nitrogen compounds, the waste water has to be subjected to a predetermined treatment before discharged into the environment.

In the present embodiment, the water treatment device 1 includes: a fluorine content removing unit 2 which removes a substance to be removed containing the fluorine components in the for-treatment water; an electrolysis treatment unit 3 which electrochemically treats the water subjected to the fluorine content removing treatment; and a biological treatment unit 4 which biologically treats the water subjected to the electrochemical treatment.

The fluorine content removing unit 2 includes a reservoir tank 11, a neutralization tank 12, a reaction tank 13, a membrane separation unit 14 and a filter press 15. The reservoir tank 11 is a tank for once reserving the waste water discharged from the plant or the like and containing the fluorine components and the nitrogen compounds, that is, the for-treatment water, and the tank is connected to the neutralization tank 12 in a rear stage by a pipe 16 provided with a pump (not shown). It is to be noted that the for-treatment water conveyed from the reservoir tank 11 to the neutralization tank 12 is strong acid having a pH of about 2 owing to hydrofluoric acid, mixed acid or the like, and it is therefore assumed that the tank is formed of a material such as glass having excellent resistance to acid.

The neutralization tank 12 includes a neutralizing agent adding unit 17 as means for adjusting the pH. In the present embodiment, since the for-treatment water conveyed from the reservoir tank 11 has a pH of about 2, as a neutralizing agent to be charged into the neutralizing agent adding unit 17, there is used an aqueous solution containing 25 wt % of sodium hydroxide (NaOH). In this neutralization tank 12, a nitric acid sensor 18 is disposed to detect a concentration of nitric acid in the for-treatment water, and the nitric acid sensor 18 is connected to a control unit (not shown).

Moreover, the neutralization tank 12 is connected to the reaction tank 13 in the rear stage by a pipe 19 provided with a pump (not shown). The reaction tank 13 includes a calcium chloride adding unit 20 as calcium content adding means. The calcium chloride adding unit 20 is a unit which adds, for example, about 30 wt % of calcium chloride ($CaCl_2$) aqueous solution to the for-treatment water in the reaction tank 13.

Moreover, the reaction tank 13 is connected, by a pipe 21, to the membrane separation unit 14 which subjects the for-treatment water in the reaction tank 13 to a membrane separation treatment. This membrane separation unit 14 is a unit constituted by submerging a filter membrane 14A in a reservoir tank in which the for-treatment water is reserved. The filter membrane 14A is submerged in the for-treatment water stored in the reservoir tank, and has a function of filtering the for-treatment water. As the filter membrane 14A to be adopted, it is possible to generally adopt a filter mechanism capable of exerting the filtering function in a fluid.

Moreover, this membrane separation unit 14 is provided with a gas diffusing unit 14B which feeds bubbles to the filter membrane 14A from below. A gas to be diffused may be air, but in the present embodiment, the gas diffusing unit 14B is connected to a nitrogen gas feed path 22 connected to nitrogen feed means. Accordingly, the bubbles of a nitrogen gas are fed to the filter membrane 14A of the membrane separation unit 14. Therefore, when an inactive gas such as nitrogen is used, an anaerobic biological treatment in the rear stage can more efficiently be performed.

The membrane separation unit 14 is connected, by a pipe 23, to the rear-stage filter press 15 which treats a separated solid content or a solidified substance to be removed. The filter press 15 is a unit which lowers a moisture content of the substance to be removed. In the present embodiment, the filter press 15 includes a water feed path 24, and the water is fed to the filter press 15 to clean and remove neutral salt such as sodium chloride contained in the substance to be removed stored in the filter press 15.

Moreover, the membrane separation unit 14 is connected to a pipe 25 provided with a pump (not shown) for conveying the water filtered by the filter membrane 14A to a reservoir tank 5 constituted separately from the fluorine content removing unit 2.

Moreover, the reservoir tank 5 is connected to an electrolysis tank 6 constituting the electrolysis treatment unit 3 by a pipe 27 provided with a pump 26 as conveyance means. Here, the electrolysis treatment unit 3 is constituted of: the electrolysis tank 6 constituting an electrolysis chamber 28 having therein an inflow port and an outflow port (not shown) of the for-treatment water; a pair of electrodes 29, 30 disposed to face each other so that at least a part of the electrodes is submerged in the for-treatment water in the electrolysis chamber 28; a power source 31 for conducting electricity to the electrodes 29, 30; the control unit for controlling the power source 31 and the like. It is to be noted that the electrolysis tank 6 may be provided with stirring means for stirring the inside thereof.

Each of the electrodes 29, 30 is constituted of, for example, a noble metal electrode made of platinum (Pt) or a mixture of platinum and iridium (Ir), or an insoluble electric conductor coated with such a noble metal. It is to be noted that in the present embodiment, the platinum electrode is used. In the present embodiment, each of the electrodes 29, 30 is constituted of the noble metal or the electric conductor coated with the noble metal, but in a case where polarities of the electrodes 29, 30 are not switched, at least the electrode 29 constituting an anode may be constituted of the noble metal or the electric conductor coated with the noble metal, and the electrode 30 constituting a cathode may be constituted of another electric conductor.

Moreover, in the above, the noble metal or the electric conductor coated with the noble metal may be the electric conductor plated or sintered with the noble metal.

Furthermore, in the present embodiment, there is disposed a circulation pipe 33 which communicates with the electrolysis chamber 28 and through which the water is circulated by a pump 32. The circulation pipe 33 is provided with: a pH sensor 34 for detecting the pH of the for-treatment water which flows from the electrolysis chamber 28 into the sensor; and an ORP sensor 35 for detecting an oxidation reduction potential (ORP). These pH sensor 34 and ORP sensor 35 are connected to a control unit constituting end judgment means for judging the end of the treatment by an electrochemical technique and/or reduction treatment end judgment means for judging the end of a reduction treatment of hypohalogenous acid in the for-treatment water. The electrolysis tank 6 is provided with a pH adjustment unit 36 as pH adjustment means. In the present embodiment, as a regulator to be charged into the pH adjustment unit 36, an aqueous solution containing sodium hydroxide (NaOH) is used.

In addition, in the present embodiment, the electrolysis tank 6 is provided with reducing agent adding units 37, 38 as means for reducing hypohalogenous acid such as hypochlorous acid generated in the for-treatment water. In the present embodiment, in the reducing agent adding unit 37, as a reducing agent of hypochlorous acid, a sodium nitrite solution is used. Furthermore, in the reducing agent adding unit 38, as the reducing agent of hypochlorous acid or an agent which exerts a function of adjusting the pH of the for-treatment water, oxalic acid is used. Instead of the addition of the reducing agent, hypohalogenous acid may be reduced by a catalyst or aeration.

Moreover, the electrolysis tank 6 is connected to a pretreatment tank 7 via a pipe 40. The pretreatment tank 7 is a tank for regulating the water electrochemically treated in the electrolysis tank 6. This pretreatment tank 7 includes therein a gas diffusing unit 41, and the gas diffusing unit 41 is connected to a nitrogen gas feed path 42 connected to nitrogen feed means in the same manner as in the gas diffusing unit 14B.

Furthermore, this pretreatment tank 7 is connected to a circulation pipe 43 connected to a constant-temperature tank 8. This constant-temperature tank 8 heats the for-treatment water so that a temperature of the for-treatment water in the constant-temperature tank 8 is not, for example, +15° C. or less. It is to be noted that to heat the constant-temperature tank 8, there may be used waste heat obtained by exchanging heat with another unit that generates heat in the device 1, such as the electrolysis tank 6.

In addition, the pretreatment tank 7 is connected to an organic substance feed unit 45 which feeds an organic substance required for activity of a living matter in the biological treatment. In the present embodiment, in the organic substance, for example, methanol is used, but in addition, there may be used alcohol containing one or more of ethanol, propanol and isopropyl alcohol.

Moreover, the pretreatment tank 7 is connected to a diluting water feed unit 46 for performing dilution so that the for-treatment water indicates a nitric acid concentration which is not more than a predetermined concentration. In the present embodiment, the nitric acid concentration of the for-treatment water is controlled beforehand using a value detected by the nitric acid sensor 18 in the neutralization tank 12 of the fluorine content removing unit 2. It is to be noted that in the diluting water feed unit 46, tap water such as city water may be used, but the water treated by the water treatment device 1 of the present embodiment may be substituted by feeding the treated water for reuse to the pretreatment tank 7 by a circulation pipe 47.

Furthermore, this pretreatment tank 7 is connected to the rear-stage biological treatment unit 4 by a pipe 48. In the present embodiment, the biological treatment unit 4 includes a plurality of biological treatment tanks 9. In the embodiment shown in FIG. 1, three biological treatment units 51 each including two biological treatment tanks 9, 9 and one pump 50 as conveyance means are connected in parallel with one another by a branch pipe 52, and six biological treatment tanks 9 in total are arranged.

Each of the biological treatment tanks 9 is provided with a denitrification reaction chamber 53 having inflow ports of the for-treatment water in a lower portion or bottom thereof, and the inside of the denitrification reaction chamber 53 is brought into an anaerobic state in which any dissolved oxygen does not exist. It is to be noted that in the for-treatment water which is to be fed to the biological treatment tank 9, dissolved oxygen is already replaced with the nitrogen gas in the pretreatment tank 7. The lower portion of this denitrification reaction chamber 53 is filled with granular sludge 54, and gas-solid-liquid separation means 55 is disposed in an upper portion of the chamber.

The granular sludge 54 is obtained by self-granulating heterotrophic bacteria (microorganisms) which reduce nitrate nitrogen or nitrite nitrogen in the for-treatment water to the nitrogen gas on at least anaerobic conditions, such as micrococcus denitrificans, pseudomonas denitrificans or pseudomonas aerufinosa, into grain sizes of about 0.5 to 2 mm.

It is to be noted that in the present embodiment, the denitrification reaction chamber 53 is charged with the granular sludge 54, but alternatively, the denitrification reaction chamber 53 may be charged with microorganisms carried by a carrier to perform a denitrification treatment. In such a case, a concentration of the microorganisms in the denitrification reaction chamber 53 can be raised, and the for-treatment water can be treated more effectively.

Furthermore, in this denitrification reaction chamber 53, a filter membrane 56 is disposed in a state in which the membrane comes into contact with at least a layer constituted of the granular sludge. In the embodiment, the membrane is disposed in a state in which a part of the membrane is buried. In the present embodiment, the filter membrane 56 is constituted of a so-called flat membrane. The flat membrane includes filters on front and rear surfaces of a rectangular frame, and is constituted to discharge a liquid filtered by the filters from an upper takeout port formed to communicate with a space formed between the filters. In the present embodiment, the takeout port of the filter membrane 56 is connected to a pipe 58 provided with a pump 57. The pipes 58 connected to the biological treatment tanks 9 are all connected to a rear-stage release tank 10.

The release tank 10 once reserves the water treated by the front-stage biological treatment unit 4, and in the release tank 10, a gas diffusing unit 59 is disposed to decompose the organic substance contained in the for-treatment water. The gas diffusing unit 59 is connected to an air feed path 62. Furthermore, the release tank 10 is connected to a release pipe 61 provided with a pump 60, and the release pipe 61 is connected to the circulation pipe 47 on a downstream side of the pump 60. In consequence, the treated water can be fed as diluting water to the pretreatment tank 7.

In accordance with the above constitution, there will be described a treatment operation of the water treatment device 1 in the present embodiment. It is to be noted that as described above in detail, it is assumed that the for-treatment water is waste water from the semiconductor plant, which contains the highly concentrated fluorine components and nitrogen compounds.

(1) Fluorine Content Removing Treatment

First, the substance to be removed containing the fluorine component is removed from the for-treatment water in the fluorine content removing unit 2. After once reserving, in the reservoir tank 11, the for-treatment water which is strong acid having a pH of about 2 owing to hydrofluoric acid, mixed acid or the like, the for-treatment water is appropriately conveyed to the rear-stage neutralization tank 12 via the pipe 16 by the pump.

Moreover, in the neutralization tank 12, the pH of the for-treatment water is adjusted by the neutralizing agent adding unit 17. In this case, the pH of the for-treatment water, fed to the neutralization tank 12, is about 2, and the pH of the for-treatment water is adjusted between, for example, 7 and 8 by 25 wt % of sodium hydroxide (NaOH) aqueous solution for use as the neutralizing agent. It is to be noted that in the vicinity of neutrality, 99.9% or more of hydrogen fluoride in the for-treatment water is dissociated into a hydrogen ion and a fluoride ion.

Moreover, the for-treatment water having the pH thereof adjusted by the neutralization tank 12 is appropriately conveyed to the rear-stage reaction tank 13 via the pipe 19 by the pump (not shown). In the reaction tank 13, a calcium content, that is, about 30 wt % of calcium chloride ($CaCl_2$) aqueous solution is added to the fluorine content contained in the for-treatment water having the pH thereof adjusted by the calcium chloride adding unit 20. Accordingly, calcium fluoride (CaF) is generated in the for-treatment water. Accordingly, the fluorine content in the for-treatment water is fixed as calcium fluoride. It is to be noted that the for-treatment water containing calcium fluoride is a slurry-like white liquid.

Furthermore, the white for-treatment water in the reaction tank 13 is conveyed to the rear-stage membrane separation unit 14 via the pipe 21. In this membrane separation unit 14, the for-treatment water is filtered by the filter membrane 14A submerged in the reservoir tank. In the present embodiment, the for-treatment water is filtered using a self forming film formed on the surface of the filter membrane 14A, thereby performing solid-liquid separation into calcium fluoride and the for-treatment water. Accordingly, the slurry-like white for-treatment water, containing calcium fluoride, is subjected to the solid-liquid separation into calcium fluoride and the for-treatment water, by the filtering function of the filter membrane 14A.

It is to be noted that the above self forming film may be a self forming film made of the substance to be removed containing calcium fluoride generated in the for-treatment water. That is, the for-treatment water is filtered by the substance to be removed adsorbed by a filtering surface of the filter membrane 14A. To recover calcium fluoride, this self forming film is peeled from the filter membrane 14A and recovered.

Moreover, as to calcium fluoride to be separated by the membrane separation unit 14, to improve a filtering efficiency, it is effective to mature the for-treatment water for a predetermined time from the reaction in the reaction tank 13, thereby growing particles of calcium fluoride into, for example, 0.25 μm or more. In this case, it is easy to separate the film of calcium fluoride.

It is to be noted that in the membrane separation unit 14 of the present embodiment, in the reservoir tank to reserve the for-treatment water, the gas diffusing unit 14B is disposed to feed the bubbles to the filter membrane 14A from below, whereby the bubbles of the nitrogen gas are fed to the filter membrane 14A.

Therefore, the bubbles generated from the gas diffusing unit 14B move upwards along the filtering surface of the filter membrane 14A. When the bubbles are generated from the gas diffusing unit 14B in this manner, a thickness of the self forming film formed on the surface of the filter membrane 14A can be set to be not more than a certain thickness. In consequence, while inhibiting the self forming film from being closed, and securing a certain degree of flux, it is possible to maintain the filtering efficiency of the for-treatment water.

It is to be noted that in the present embodiment, as a gas to be generated from the gas diffusing unit 14B, the nitrogen gas is adopted which is an inactive gas. Therefore, in a case where air is fed from the gas diffusing unit 14B to the for-treatment water, carbon dioxide contained in air might react with the calcium content contained in the for-treatment water to lower the concentration of calcium fluoride. However, since the gas to be fed from the gas diffusing unit 14B is the nitrogen gas as the inactive gas, such a danger can be avoided.

The solid content separated by the membrane separation unit 14 in this manner, that is, the solidified substance to be removed is conveyed to the filter press 15 via the pipe 23. Since this filter press 15 is connected to the cleaning water feed path 24 as described above, there is cleaned and removed neutral salt such as sodium chloride contained in the substance to be removed stored in the filter press 15.

Accordingly, a large part of the neutral salt is released from the filter press 15 to the outside, and calcium fluoride having a small solubility as compared with the neutral salt remains in the filter press 15, and is dewatered by the filter press 15, whereby the fluorine components can be recovered as high-purity calcium fluoride from the for-treatment water. Specifically, after dewatering the substance to be removed by the filter press 15, the substance to be removed having a semi-solidified state is taken out. In this state, the moisture content of the substance to be removed is about 50 wt %. Next, the substance to be removed is dried to form a solidified block of the substance to be removed. In the present embodiment, the substance to be removed is obtained which contains 85 wt % of calcium fluoride.

It is to be noted that in the present embodiment, since the solid-liquid separating treatment is performed without using any flocculating agent such as a polymer flocculating agent, it is possible to obtain solidified high-purity calcium fluoride (in general, fluorite) from the for-treatment water containing the fluorine content. Calcium fluoride obtained can be allowed to react with strong acid (e.g., sulfuric acid) for reuse as hydrofluoric acid in a semiconductor manufacturing step or the like. Furthermore, high-purity calcium fluoride obtained in the present embodiment may be used as flux to be mixed in iron steel. If hydrochloric acid is added to calcium fluoride obtained, calcium chloride can be obtained. Furthermore, since sulfuric acid, hydrochloric acid or the like to be added for reuse of calcium fluoride is a chemical always equipped in the semiconductor plant, calcium fluoride can be reused without adding any equipment in the plant.

On the other hand, a liquid content separated by the membrane separation unit 14, that is, the for-treatment water from which calcium fluoride has been removed is conveyed to the reservoir tank 5 via the pipe 25 by the pump. Since the fluorine content is removed from the for-treatment water reserved in the reservoir tank 5, nitric acid, a nitrogen compound such as ammonia, chlorine, sodium, calcium and the like are contained. The for-treatment water conveyed in the reservoir tank 5 is appropriately sent to the electrolysis tank 6 via the pipe 27 by the pump 26.

(2) Electrochemical Treatment

In a state in which the for-treatment water is reserved in the electrolysis tank 6, the power source 31 is turned on by the control unit, a positive potential is applied to the electrode 29, and a negative potential is applied to the electrode 30. Accordingly, the electrode 29 turns to the anode, and the electrode 30 turns to the cathode.

In a case where such a potential is applied, since each of the electrodes 29, 30 is constituted of the insoluble electric conductor capable of generating hypohalogenous acid, ozone or active oxygen, on the side of the electrode 29 constituting the anode, a chloride ion (halide) contained in the for-treatment water releases an electron to generate chlorine (halogen) (Reaction A). Moreover, chlorine (halogen) is dissolved in the water to generate hypochlorous acid (hypohalogenous acid) (Reaction B). At this time, simultaneously ozone or active oxygen is also generated. Reactions A and B are as follows:

$$2Cl^- \rightarrow Cl_2 + 2e^-; \text{ and} \qquad \text{Reaction A}$$

$$Cl_2 + H_2O \rightarrow HClO + HCl. \qquad \text{Reaction B}$$

It is to be noted that since the respective electrodes 29, 30 are the insoluble electric conductors, it is possible to avoid a disadvantage that the electrodes 29, 30 are eluted in the water treated by electrolysis, and it is possible to simplify an maintenance operation such as replacement of the electrodes 29, 30. Since each electrode is made of the noble metal or constituted of the electric conductor coated with the noble metal as in the present embodiment, hypohalogenous acid or the like can be generated more effectively in the for-treatment water. Since a calcium-containing solution is electrolyzed, a scale such as calcium hydroxide is attached on a cathode side. To prevent this, the polarity is changed.

Moreover, generated hypochlorous acid (hypohalogenous acid) reacts with ammonia or ammonium ion (ammonia nitrogen) contained in the for-treatment water, subjected to a plurality of chemical changes and converted into the nitrogen gas (Reaction C) Reaction C is as follows:

$$NH_3 + HClO \rightarrow NH_2Cl + H_2O; \quad \text{Reaction C}$$

$$NH_2Cl + HClO \rightarrow NHCl_2 + H_2O; \text{ and}$$

$$NH_2Cl + NHCl_2 \rightarrow N_2\uparrow + 3HCl.$$

Furthermore, ammonia or ammonium ion (ammonia nitrogen) in the for-treatment water reacts with ozone generated on the electrode 29 side constituting the anode or active oxygen as in Reaction D, and is accordingly denitrified into the nitrogen gas. Reaction D is as follows:

$$2NH_3(aq) + 3(O) \rightarrow N_2\uparrow + 3H_2O. \quad \text{Reaction D}$$

Accordingly, ammonia or ammonia nitrogen as the ammonium ion in the for-treatment water is denitrified into the nitrogen gas, when the for-treatment water is electrolyzed.

In such an electrolysis treatment, as described above, ammonia reacts with hypochlorous acid as in Reaction C described above, to generate intermediate products such as monochloroamine and dichloroamine. With the reaction of the intermediate products, the denitrification to generate the nitrogen gas proceeds. Here, intermediate products such as monochloroamine and dichloroamine have high dependence on the pH. In a case where the pH is above 4.4, trichloroamine exists. If the pH is 4.4 to 5, dichloroamine exists. If the pH is below 8, monochloroamine exists. Therefore, to allow both of monochloroamine and dichloroamine to exist in the for-treatment water, the pH needs to be 5 to 8.

On the other hand, as shown in Reaction C described above, with the proceeding of the denitrification of ammonia nitrogen, hydrochloric acid is generated in the for-treatment water. Therefore, in proportion to an amount of ammonia nitrogen to be treated in the for-treatment water, the pH of the for-treatment water tilts to acidity. If the pH drops to a predetermined value or less as described above, however, intermediate products such as monochloroamine and dichloroamine are inhibited from being generated by the reaction of ammonia nitrogen and hypochlorous acid, and it is difficult to denitrify ammonia into the nitrogen gas finally.

Moreover, if the for-treatment water indicates the acidity indicating a pH of 4 or less, hypochlorous acid in the for-treatment water is gradually changed into a chlorine gas, and the chlorine gas is diffused in the air, which is not preferable for the treatment.

To solve the problem, in the present embodiment, during the electrolysis treatment, the sodium hydroxide aqueous solution is added as the regulator by the pH adjustment unit 36 based on an output of the pH sensor 34. Accordingly, the pH of the for-treatment water is adjusted to inhibit the generation of the chlorine gas. It is to be noted that in the present embodiment, to promote the generation of intermediate products such as monochloroamine and dichloroamine generated in a denitrification treatment process of ammonia, the control unit adjusts the pH of the for-treatment water into a range of 5 to 8 based on the output of the pH sensor 34.

Moreover, the control unit determines an end point of the electrolysis treatment based on an output of the ORP sensor 35 to end the electrolysis.

Figure 3:
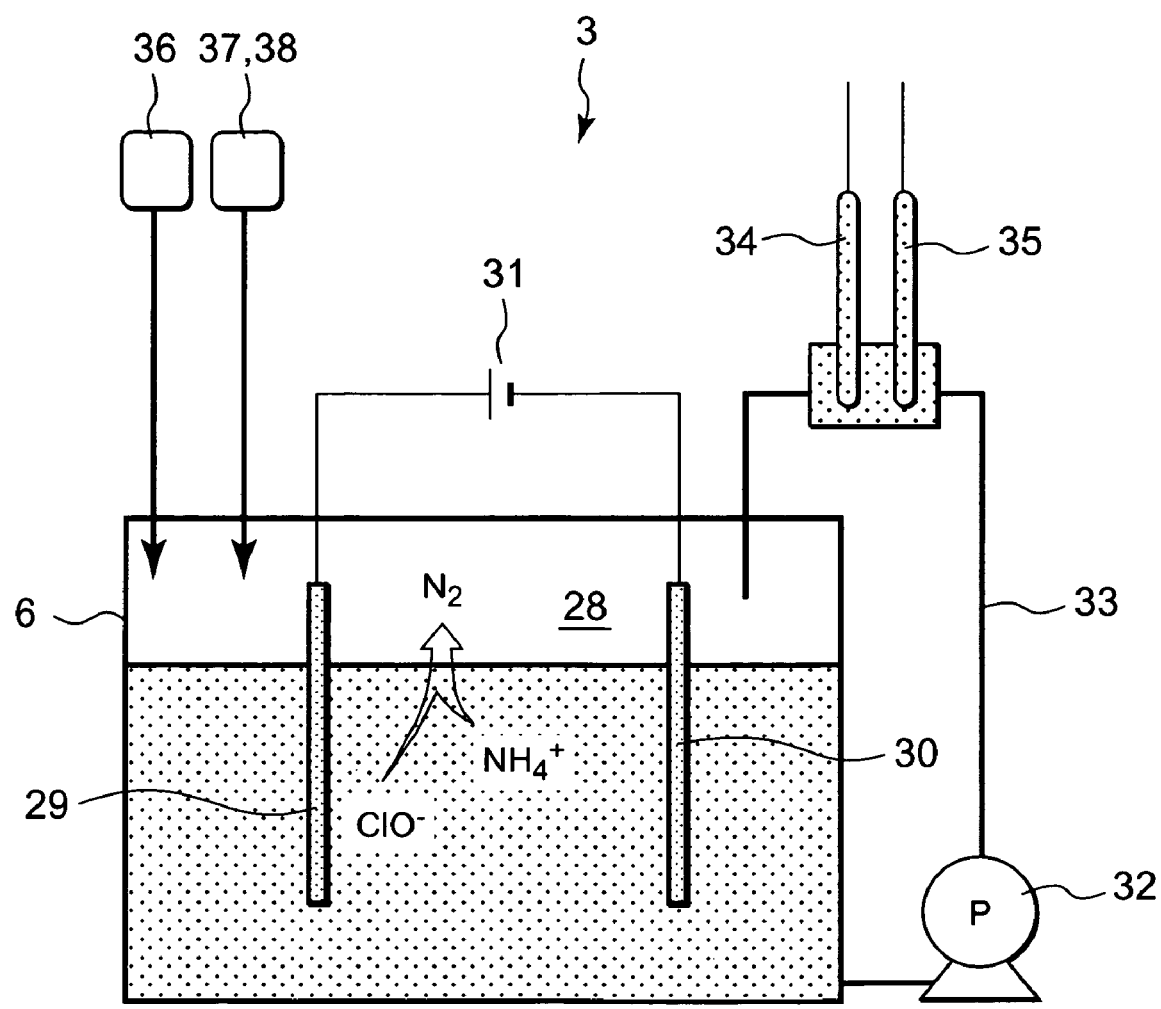
FIG. 3 is a schematic explanatory view of the electrochemical treatment unit.
Figure 4:
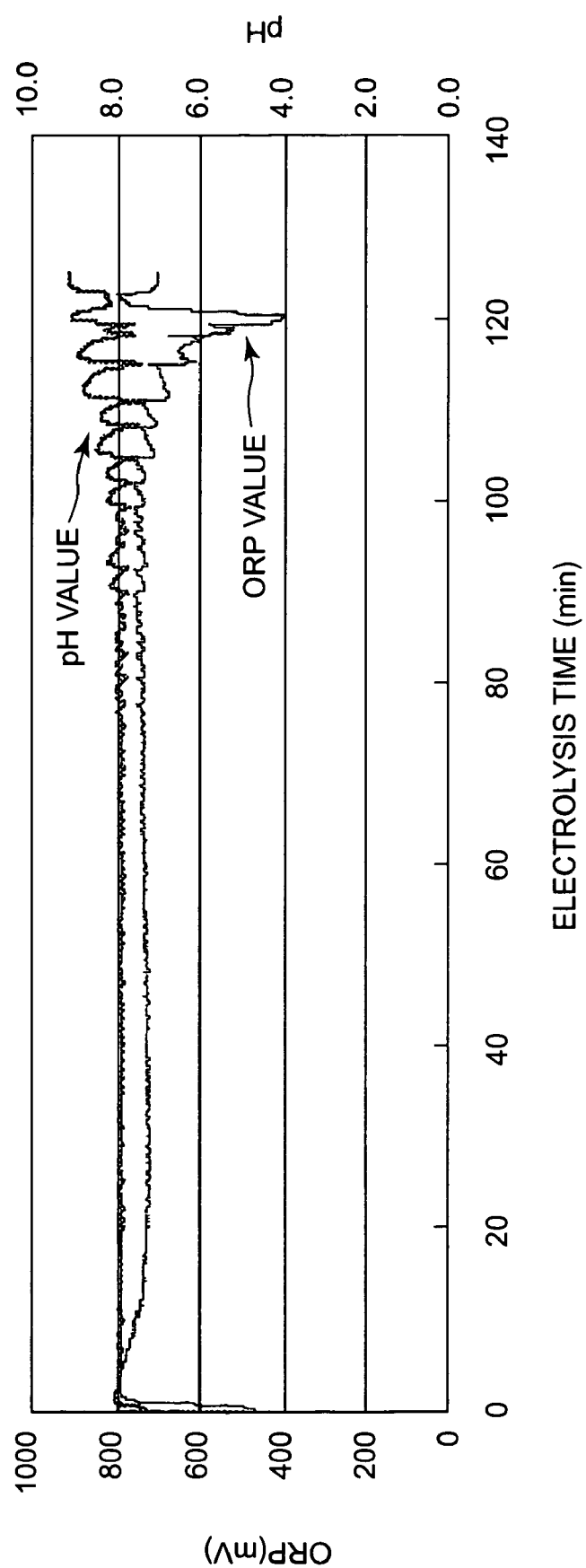
FIG. 4 is a diagram showing changes of an ORP and pH with respect to an electrolysis time.
Figure 5:
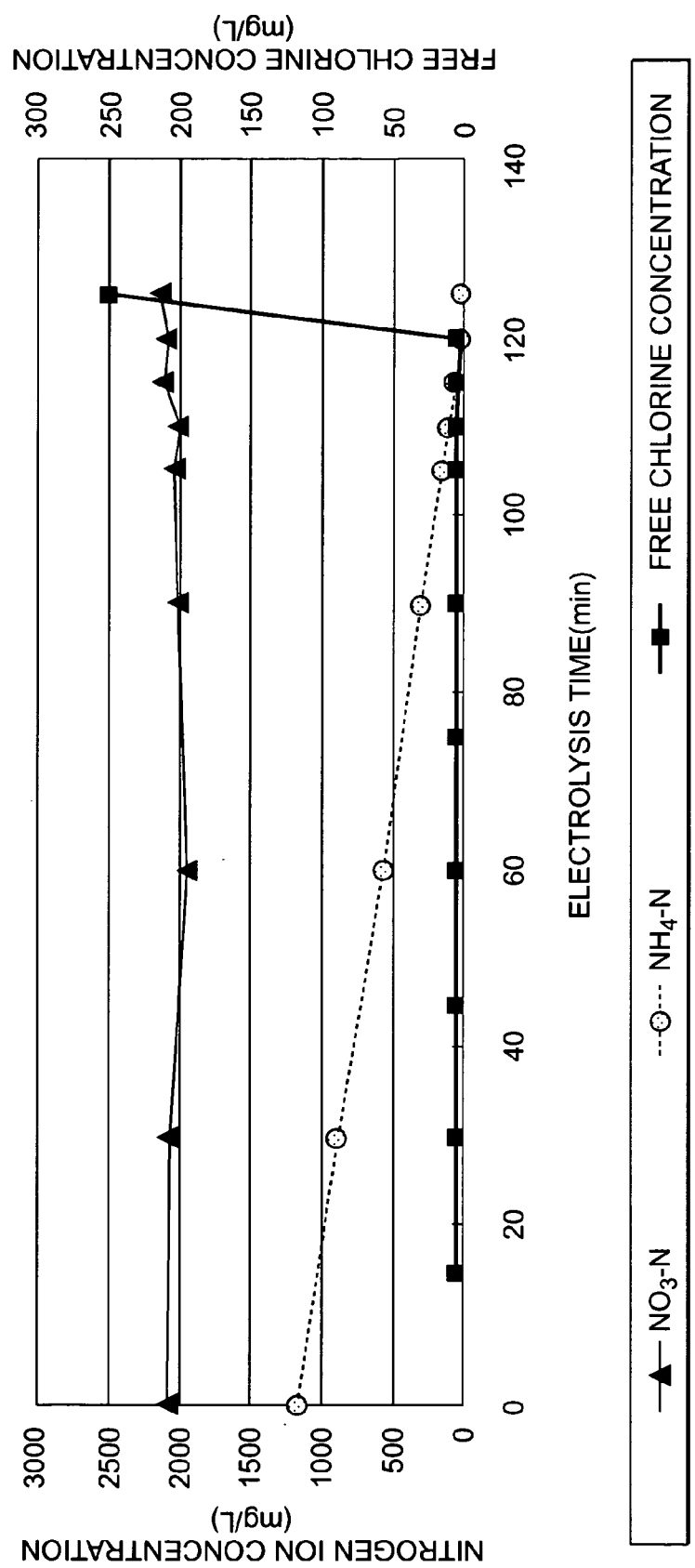
FIG. 5 is a diagram showing changes of a nitrite nitrogen concentration, an ammonia nitrogen concentration and a free chlorine concentration with respect to the electrolysis time.

Here, there will be described the judgment of the end of the treatment of ammonia in the for-treatment water with reference to FIGS. 3 to 5. FIG. 3 is a schematic explanatory view of the electrolysis treatment unit 3, and FIGS. 4 and 5 show experiment results. In the electrolysis tank 6, in accordance with chemical reactions such as Reaction A to Reaction C, ammonia in the for-treatment water is reduced into the nitrogen gas. In this case, with the proceeding of the treatment of ammonia in the for-treatment water, the oxidation reduction potential (ORP) changes, which is attributable to an amount of hypochlorous acid to be accumulated in the for-treatment water. The pH changes owing to the above decrease of the amount of ammonia in the for-treatment water, and sodium hydroxide as the regulator added by the pH adjustment unit 36. Accordingly, in the present embodiment, a degree of the proceeding of the removing reaction of ammonia is estimated based on the ORP and the pH of the for-treatment water in the electrolysis tank 6, and power supplies to the electrodes 29, 30 are controlled based on the estimation.

FIG. 4 shows one example of a relation between an electrolysis time and the ORP and a pH of the for-treatment water in the electrolysis tank 6 in a case where ammonia nitrogen is removed by the electrolysis reaction of the electrolysis treatment unit 3. FIG. 5 shows a relation among a nitrate nitrogen concentration, a ammonia nitrogen concentration and a free chlorine concentration in a case where ammonia nitrogen is removed by the electrolysis reaction of the electrolysis treatment unit 3 corresponding to FIG. 4. In experiments of FIGS. 4 and 5, the electrolysis treatment was performed using 1000 mL of simulated for-treatment water in which a chloride ion concentration was 10000 mg/L, the nitrate nitrogen concentration was 2000 mg/L and the ammonia nitrogen concentration was 1000 mg/L at a current value of 3A, while adjusting the pH into 8 by the pH regulator made of sodium hydroxide.

In FIG. 5, ammonia nitrogen is gradually reduced, and the removing of the ammonia nitrogen ends with an elapse of an electrolysis time of about 120 minutes. At the same time the removing of ammonia nitrogen ends, free chlorine, that is, hypochlorous acid in the for-treatment water rapidly increases. On the other hand, in FIG. 4, with an elapse of a treatment time, the ORP of the for-treatment water in the electrolysis tank 6 decreases, while finely increasing or decreasing, and a rapid rise is indicated with an elapse of an electrolysis time of about 120 minutes. This is supposedly because the ORP of the for-treatment water changes owing to an influence of hypochlorous acid (hypohalogenous acid), monochloroamine or dichloroamine contained in the for-treatment water in the electrolysis tank 6.

That is, in a case where ammonia sufficiently exists in the for-treatment water, a balance between generation and consumption of monochloroamine or dichloroamine as the intermediate product is substantially constant. On the other hand, with the proceeding of the ammonia removing treatment, the balance between the generation and the consumption of monochloroamine or dichloroamine collapses, monochloroamine or dichloroamine decreases, and the ORP of the for-treatment water gradually drops. Moreover, when ammonia (ammonia nitrogen) is removed from the for-treatment water, hypochlorous acid (hypohalogenous acid) generated by the electrolysis remains in the for-treatment water without being consumed. Therefore, with the increase of hypochlorous acid, the ORP value of the for-treatment water rapidly rises.

In the present embodiment, based on the degree of the change of the ORP and the pH value of the for-treatment water in the electrolysis tank 6, the degree of the proceeding of the ammonia nitrogen removing reaction is estimated. Based on the proceeding degree, the value of the current to be passed between the electrodes 29 and 30 is controlled. Moreover, in one or both of a case where the change of the ORP of the for-treatment water in the electrolysis tank 6 undergoes a transition and a case where the pH of the for-treatment water in the electrolysis tank 6 reaches a predetermined value, it is estimated that the removing of ammonia nitrogen ends, and powers to be supplied to the electrodes 29, 30 are controlled.

Figure 6:
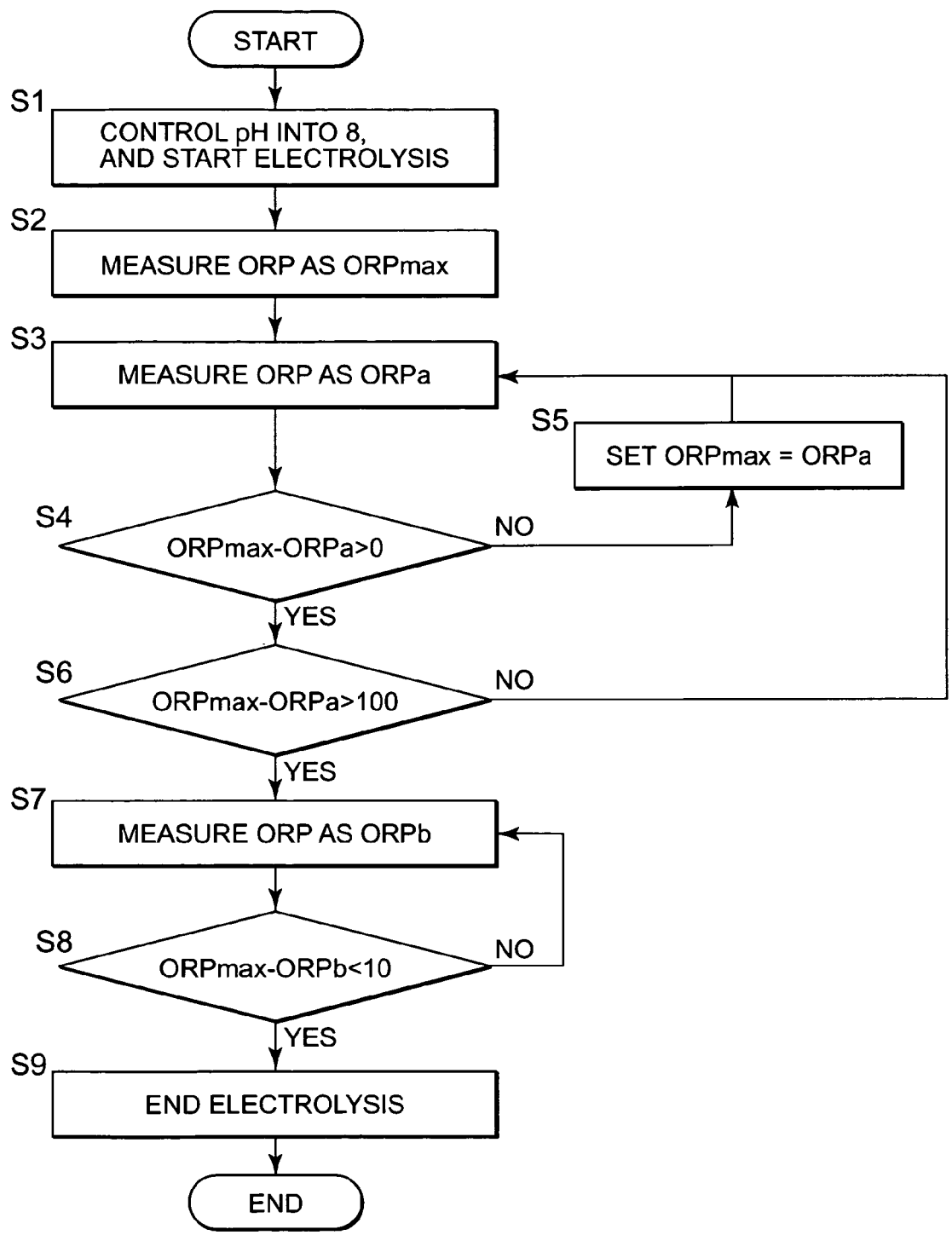
FIG. 6 is a flow chart showing control contents based on the change of the ORP.

There will be described hereinafter control contents based on the change of the ORP in the present embodiment with reference to a flow chart of FIG. 6. First, in S1, the control unit starts the electrolysis treatment, while controlling the pH into a predetermined value of 8. Next, in S2, the ORP of the for-treatment water in the electrolysis tank 6 is measured by the ORP sensor 35, and the measured ORP value is stored as ORPmax. Next, in S3, the ORP is measured, and the measured ORP value is stored as ORPa.

Moreover, in S4, the control unit calculates a difference between ORPmax and ORPa. If ORPmax is smaller than ORPa, in S5, ORPmax is replaced with ORPa to store ORPa, and thereafter the flow returns to S3. On the other hand, if ORPmax is larger than ORPa, the flow advances to processing of S6. If a value obtained by subtracting ORPa from ORPmax is 100 mV or less, the flow returns to S3. If the value is larger than 100 mV, the flow advances to processing of S7.

Next, in S7, the ORP is measured, and the measured ORP value is stored as ORPb. Moreover, in S8, the control unit calculates a difference between ORPmax and ORPb. If a value obtained by subtracting ORPb from ORPmax is 10 mV or more, the flow returns to S7. If the value is smaller than 10 mV, the flow advances to processing of S9. After the electrolysis by the electrodes 29, 30 is ended, the processing is ended. Accordingly, it is possible to judge the transition of the change of the ORP at the end of the treatment reaction of the for-treatment water, and it can be judged that the treatment reaction of the for-treatment water in the electrolysis tank 6 has ended.

Therefore, since a proceeding situation of the electrolysis reaction of ammonia nitrogen in the for-treatment water in electrolysis tank 6 is judged by the change of the ORP, it is possible to exactly treat ammonia nitrogen in the for-treatment water. Moreover, it is possible to avoid a disadvantage that the power is consumed more than necessary.

On the other hand, the pH of the for-treatment water changes with the decrease of the amount of ammonia in the for-treatment water and sodium hydroxide as the regulator added by the pH adjustment unit 36. When the reaction of ammonia and hypochlorous acid in the for-treatment water ends, hydrochloric acid is not generated in the for-treatment water. Therefore, the pH of the for-treatment water does not tilt to the acidity. Therefore, the control unit periodically adds each certain amount of sodium hydroxide as the pH regulator to the for-treatment water, and the pH of the for-treatment water does not tilt to the acidity in accordance with the added amount. That is, when the pH shifts to alkaline in accordance with the degree of the pH adjustment, the degree of the proceeding of the removing reaction of ammonia is estimated, and the power supplies to the electrodes 29, 30 are controlled based on the estimation.

In consequence, since the electric conduction to the electrodes 29, 30 is controlled based on the degree of the change of the ORP of the for-treatment water detected by the ORP sensor 35, it is possible to exactly judge the treatment end time of ammonia nitrogen in accordance with the concentration of ammonia nitrogen in the for-treatment water without using any expensive sensor such as an ammonia nitrogen concentration measurement unit.

Therefore, it is possible to avoid a disadvantage that the treatment of ammonia nitrogen in the for-treatment water ends halfway, and ammonia nitrogen remains in the treated water, and a disadvantage that the electrolysis is performed more than necessary to waste the power. In consequence, running costs can be reduced. Especially, since the electrolysis is not performed more than necessary, it is possible to avoid a disadvantage that hypohalogenous acid is excessively generated in the for-treatment water.

Especially, in the present embodiment, since the processing end time of ammonia nitrogen is judged based on the changes of the ORP and the pH of the for-treatment water, it is possible to control the electrolysis more precisely, and power can exactly be saved.

Moreover, as described above, since the pH of the for-treatment water in the electrolysis tank 6 is adjusted into a range of 5 to 8 by the pH adjustment unit 36, there is not any large influence on the generation of intermediate products such as monochloroamine and dichloroamine in the denitrification reaction of hypohalogenous acid and ammonia generated in the water treated by the electrochemical technique. Therefore, the fluctuation of the ORP is not largely influenced by the fluctuation of the pH of the for-treatment water, and it is possible to more precisely judge the processing end time of ammonia nitrogen.

Furthermore, since the pH of the for-treatment water is not set to 4 or less, it is possible to suppress a disadvantage that hypohalogenous acid such as hypochlorous acid generated in the for-treatment water is released as a halogen gas such as the chlorine gas to the air.

After the end of the electrolysis treatment, the control unit adds the sodium nitrite solution and oxalic acid as the reducing agents of hypochlorous acid (hypohalogenous acid) to the for-treatment water by the reducing agent adding units 37, 38 disposed in the electrolysis tank 6.

Here, the control unit judges the reduction end time of hypochlorous acid (hypohalogenous acid) based on the detection of the ORP sensor 35 and the pH sensor 34. That is, the control unit adjusts the pH of the for-treatment water into a predetermined range of, for example, 5 to 8 by the pH adjustment unit 36 based on the detection of the pH sensor 34, and successively detects the ORP of the for-treatment water after the electrolysis treatment.

The ORP fluctuates based on the amount of hypochlorous acid (hypohalogenous acid) in the for-treatment water. Therefore, in a case where the ORP is detected in a state in which the for-treatment water is adjusted into a certain pH range, when the ORP is not more than a predetermined value, it can be judged that the reduction treatment of hypochlorous acid (hypohalogenous acid) has ended.

Especially, in the present embodiment, in a case where the reduction end of hypochlorous acid (hypohalogenous acid) is judged based on the ORP, when the pH of the for-treatment water is adjusted into the certain range, the influence of the ORP depending on the pH can be reduced. It is possible to judge the reduction treatment end time of hypochlorous acid (hypohalogenous acid) more precisely.

In consequence, since hypochlorous acid (hypohalogenous acid) in the for-treatment water can be reduced without any excess or inadequacy, during the biological treatment of the for-treatment water in the rear stage, it is possible to avoid an adverse influence that trihalomethane is generated by hypochlorous acid (hypohalogenous acid). Moreover, since the reducing agent of hypochlorous acid (hypohalogenous acid) is not wasted, it is possible to eliminate a disadvantage that the running cost soars.

Especially in the present embodiment, after the end of the electrolysis treatment, the reduction treatment of an oxidizing agent is continuously performed in the electrolysis tank 6. Therefore, an expensive sensor such as the ORP sensor 35 is not disposed for the reduction treatment only, and the ORP sensor 35 for use in the electrolysis treatment can be used. In consequence, the device can be simplified, and the number of the components can be reduced.

In consequence, reduced hypochlorous acid (hypohalogenous acid) generated in the for-treatment water is fed to the biological treatment unit 4 of the rear stage. Therefore, it is possible to avoid a disadvantage that denitrification bacteria causing the denitrification reaction for use in the rear stage, which are the pH sensor 34 in the present embodiment, are adversely affected by an oxidizing agent such as hypochlorous acid generated in the water treated by the electrochemical treatment. Therefore, it is possible to suppress a disadvantage that the treatment efficiency of the biological treatment in the rear stage is deteriorated by the oxidizing agent generated by the electrolysis.

It is to be noted that in the present embodiment, since oxalic acid is used as the reducing agent, it is possible to maintain the pH of the for-treatment water in a range of about 5 to 6 even by oxalic acid. In consequence, it is possible to adjust the pH of the for-treatment water into the pH suitable for the biological treatment in the rear stage, and the treatment efficiency of the nitrogen compounds can be enhanced.

Moreover, in the present embodiment, sodium nitride and oxalic acid are used as the reducing agents, but the agent is not limited to this combination, and thiosulfate or a combination including thiosulfate may be used, with the proviso that it is preferable to use thiosulfate to such an extent that a sulfuric acid trace does not influence the biological treatment in the rear stage. This is because thiosulfate is advantageous in respect of cost.

Furthermore, in the present embodiment, as means for reducing hypochlorous acid (hypohalogenous acid), the reducing agent is used, but the means is not limited to this agent, and hypohalogenous acid in the for-treatment water may be reduced by a catalyst composed of metal peroxide and the like or aeration. Even in such a case, in the same manner as in a case where the reducing agent is used, hypohalogenous acid in the for-treatment water can easily be reduced, and the enhancement of the treatment efficiency in each biological treatment tank 9 can easily be realized. In such a case, it is assumed that the time to end the reduction treatment of hypochlorous acid (hypohalogenous acid) is judged based on the ORP detected by the ORP sensor 35 in the same manner as described above.

Thereafter, after the end of the reduction treatment of an oxidizing agent such as hypohalogenous acid in the for-treatment water in the electrolysis tank 6, the control unit conveys the for-treatment water from the electrolysis tank 6 to the rear-stage pretreatment tank 7 via the pipe 40.

(3) Pretreatment of Biological Treatment

As to the for-treatment water conveyed to the pretreatment tank 7, the nitrogen gas is fed by the gas diffusing unit 41 to thereby replace dissolved oxygen in the for-treatment water with the nitrogen gas. Accordingly, the for-treatment water is set to be anaerobic suitably for the treatment by the granular sludge 54 for use in the biological treatment. Moreover, the for-treatment water in the pretreatment tank 7 is connected to the constant-temperature tank 8 via the circulation pipe 43. Therefore, in a case where the temperature of the for-treatment water is below, for example, +15° C., the constant-temperature tank 8 heats the for-treatment water at a temperature of, for example, +15° C. or more. Accordingly, the for-treatment water in the pretreatment tank 7 is adjusted at +15° C. or more so that the temperature is suitable for the rear-stage biological treatment. It is to be noted that during the heating in the constant-temperature tank 8, as described above, there may be utilized waste heat obtained by exchanging heat with another unit such as the electrolysis tank 6 which generates heat in the device 1. In consequence, without disposing any special heat generation unit, the temperature of the for-treatment water can be raised.

Furthermore, the organic substance necessary for the activity of the living matter in the rear-stage biological treatment is fed to the for-treatment water in the pretreatment tank 7 by the organic substance feed unit 45. It is to be noted that in the present embodiment, as the organic substances, there are used alcohols including methanol and isopropyl alcohol. Therefore, the organic substances required for the biological treatment can be fed without adversely affecting the biological treatment. In consequence, the treatment efficiency of the biological treatment can be enhanced, and the adaptability of the treated water to the environment can also be improved.

In addition, in the control unit, based on the detection of the nitric acid sensor 18 disposed in the neutralization tank 12 of the fluorine content removing unit 2, in a case where the concentration of nitric acid in the for-treatment water is higher than a predetermined concentration, the diluting water feed unit 46 feeds the diluting water to the pretreatment tank 7 to adjust the concentration of nitric acid in the for-treatment water into the predetermined concentration or less. It is to be noted that as the diluting water, besides tap water such as city water, the water treated by the water treatment device 1 of the present embodiment may be fed to the pretreatment tank 7 by the circulation pipe 47 for reuse.

After the electrolyzed water is adjusted into a state suitable for the biological treatment in this manner, the control unit conveys the for-treatment water from the pretreatment tank 7 to the rear-stage biological treatment unit 4 via the pipe 48.

(4) Biological Treatment

As to the for-treatment water which is to be conveyed to the biological treatment unit 4, since the fluorine content and nitrogen compounds such as ammonia contained in the for-treatment water are treated in the front stage, in this stage, the for-treatment water contains nitric acid as a treatment object. As described above, the for-treatment water, discharged from the etching step in the semiconductor plant, contains not only the highly concentrated fluorine content but also highly concentrated ammonia and nitric acid. A part of nitric acid is denitrified in the front-stage electrolysis treatment, but to denitrify all of nitric acid in the for-treatment water by the electrolysis treatment, a longer time is required for the electrolysis treatment. Therefore, there occurs a problem that the running cost soars, which is not preferable in respect of not only treatment cost but also treatment efficiency.

Moreover, the concentration of nitric acid in the for-treatment water discharged from the plant is not constant. The concentration is high in some case, and there is hardly the treatment object in the other case. Since the fluctuation of the concentration is large, the fluctuation of the treatment load on the biological treatment unit 4 also enlarges.

To solve the problem, in the biological treatment unit 4 of the present embodiment, based on the nitric acid concentration detected beforehand by the nitric acid sensor 18 in the neutralization tank 12 of the fluorine content removing unit 2, the number of the biological treatment tanks 9 for use is changed.

Specifically, in the front-stage pretreatment tank 7, the concentration is diluted to a certain degree by the diluting water feed unit 46. In a case where the concentration of nitric acid detected by the nitric acid sensor 18 is remarkably high, however, in the present embodiment, all of the three pumps 50 are operated, and the for-treatment water is biologically treated in all of six biological treatment tanks 9.

The for-treatment water is distributed and fed to the denitrification reaction chambers 53 from below the biological treatment tanks 9 via the branch pipe 52. Since the treatment of ammonia nitrogen is almost ended by the electrolysis treatment as described above, the for-treatment water fed to the denitrification reaction chambers 53 contains little ammonia nitrogen.

The for-treatment water fed into each denitrification reaction chamber 53 from below the biological treatment tank 9 rises in the upward flowing granular sludge 54 charged in the chamber. During the rising, nitrate nitrogen and nitrite nitrogen in the for-treatment water come into contact with the denitrification bacteria as described above, and are decomposed into the nitrogen gas. That is, the denitrification bacteria oxidize the organic substances with oxygen to obtain energy, but in the present embodiment, the inside of the denitrification reaction chamber 53 is brought into the anaerobic state. Therefore, the denitrification bacteria oxidize and decompose organic substances such as methanol fed beforehand to the front-stage pretreatment tank 7 by use of oxygen in nitric acid and nitrous acid. Accordingly, nitrate nitrogen and nitrite nitrogen in the for-treatment water are denitrified by the denitrification bacteria, and reduced to the nitrogen gas (Reaction F). Reaction F will be described hereinafter. It is to be noted that hydrogen in Reaction F is fed from the organic substances added to the for-treatment water.

$$2NO_2^- + 3(H_2) \rightarrow N_2\uparrow + 2H_2O + 2OH^-; \text{ and} \qquad \text{Reaction F}$$

$$2NO_3^- + 5(H_2) \rightarrow N_2\uparrow + 4H_2O + 2OH^-.$$

In a case where the concentration of nitric acid in the for-treatment water is high in this manner, the for-treatment water is distributed and fed to the biological treatment tanks 9 to execute the biological treatment. Therefore, regardless of the concentration of nitric acid contained in the for-treatment water, the loads applied to the biological treatment tanks 9 can be reduced.

In consequence, the treatment efficiencies in the biological treatment tanks 9 can be enhanced, and the whole treatment efficiency of the for-treatment water can be enhanced. Especially, since the for-treatment water can be distributed and fed to a plurality of biological treatment tanks 9, it is possible to reduces loads on the living matters in the biological treatment tanks 9 during introducing and discharging of the for-treatment water with respect to the biological treatment tanks 9.

Moreover, in the present embodiment, since the for-treatment water is treated using the granular sludge 54 during the biological treatment, nitrate nitrogen and nitrite nitrogen in the for-treatment water can more effectively be treated.

Furthermore, the for-treatment water fed to the biological treatment tanks 9 is diluted down to the predetermined nitric acid concentration or less in the pretreatment tank 7 by the diluting water feed unit 46 as described above. Therefore, it is possible to execute the treatment with the nitric acid concentration suitable for the biological treatment, and the treatment efficiency can be enhanced.

It is to be noted that the for-treatment water fed to the biological treatment tanks 9 is adjusted beforehand at a predetermined temperature of +15° C. or more by the constant-temperature tank 8. Therefore, it is possible to execute the biological treatment at the temperature suitable for the biological treatment. In consequence, it is possible to avoid a disadvantage that, for example, in a case where the water treatment device 1 is installed outdoors, owing to a remarkable drop of the outside air temperature in the season, the activities of the living matters decline, and the treatment efficiency deteriorates. Therefore, without being influenced by the outside air temperature, the treatment efficiency of the biological treatment can be maintained.

Moreover, a nitrogen gas or a carbon dioxide gas generated in each denitrification reaction chamber 53 is discharged to the outside via the gas-solid-liquid separation means 55 disposed in the upper portion of the biological treatment tank 9. The pump 57 is operated to convey the water denitrified by the denitrification bacteria to the rear-stage release tank 10 by the pipe 58 via the filter membrane 56.

Here, since the water denitrified in the denitrification reaction chamber 53 is conveyed to the rear stage via the filter membrane 56, the granular sludge 54 rising together with the nitrogen gas, the carbon dioxide gas or the like is filtered by the filter membrane 56, and it is possible to suppress a disadvantage that the gas flows out to the rear-stage release tank 10.

Especially, the filter membrane 56 is disposed so as to come into at least a layer formed by the granular sludge 54 in the denitrification reaction chamber 53. In the present embodiment, the membrane is disposed in a buried state. Therefore, the nitrogen gas, the carbon dioxide gas and the like attached to the surfaces of particles of the granular sludge 54 can positively be stripped and discharged by the filter membrane 56. Since the nitrogen gas and the carbon dioxide gas are effectively removed from the surfaces of the particles of the granular sludge 54, an area effective for the denitrification treatment of the granular sludge 54 enlarges, and a denitrification treatment efficiency can accordingly be enhanced.

It is to be noted that in the present embodiment, the pump 57 is operated to convey the for-treatment water to the release tank 10 via the filter membrane 56, but the present invention is not limited to this embodiment. For example, when the denitrification reaction chamber 53 is closed except a feed path and an outflow path of the for-treatment water, the for-treatment water can be fed from the supply path to thereby discharge the water treated by the denitrification reaction chamber 53 from the outflow path without using any special conveyance means such as the pump. In consequence, the device can be simplified, and component costs can be reduced.

Moreover, in the present embodiment, the filter membrane 56 is buried in the granular sludge 54 when disposed, but the present invention is not limited to this embodiment. The membrane may be disposed in the denitrification reaction chamber 53 or in the outflow path of the for-treatment water externally from the denitrification reaction chamber 53. Accordingly, the granular sludge 54 is discharged out of the treatment tank, and it is possible to suppress a disadvantage that the granular sludge increases the environmental load.

On the other hand, in a case where the concentration of nitric acid detected by the nitric acid sensor 18 is lower than a predetermined value, and the denitrification treatment of nitrate nitrogen and nitrite nitrogen in the for-treatment water is possible without using all of the biological treatment tanks 9, one or two pumps 50 are operated, and the number of the biological treatment tanks 9 for use is reduced to two or four tanks in performing the biological treatment of the for-treatment water.

In this manner, the control is performed to reduce the number of the biological treatment tanks 9 to which the for-treatment water is to be fed with the decrease of the concentration of nitric acid in the for-treatment water, and increase the number of the biological treatment tanks to which the for-treatment water is to be fed with the increase of the concentration of nitric acid. Accordingly, the for-treatment water can be treated by the biological treatment tanks 9 in accordance with the concentration of nitric acid. In consequence, the biological treatment can efficiently be performed, and the treatment efficiency can be enhanced.

In this case, to select the biological treatment unit 51 for use, instead of constantly selecting the same unit 51, the control is executed so as to successively switch the biological treatment unit 51 for use periodically. In consequence, it is possible to avoid a disadvantage due to a difference of the load between the biological treatment tanks 9 in a case where a part of the biological treatment tanks 9 only are used.

Moreover, the gas diffusing unit 59 feeds air from the air feed path 62 to the water treated by the biological treatment unit 4 and conveyed to the release tank 10. Accordingly, the excessively added organic substances remaining in the for-treatment water are decomposed. After decomposing the organic substances, the treated water is discharged to environments such as rivers via the release pipe 61 by the pump 60. In this state, from the for-treatment water, the fluorine content is removed, and highly concentrated nitric acid, ammonia and the like are also effectively removed. Therefore, even when the water is released to the environment, any load is not imposed on the environments. Therefore, the treated water discharged from the plant does not have to be disposed of as industrial wastes, and this is preferable in respect of not only the environment but also the treatment cost.

It is to be noted that even after the for-treatment water is treated by the biological treatment unit 4 and conveyed to the release tank 10, for example, the nitric acid concentration detected by the nitric acid sensor 18 is remarkably high, and a treatment more sophisticated than usual is required. In this case, the for-treatment water conveyed to the release tank 10 may conveyed to the pretreatment tank 7 via the circulation pipe 47, and may be again subjected to the treatment in the biological treatment unit 4.

As described above, according to the water treatment device 1 of the present invention, in the fluorine content removing unit 2, the fluorine content can be removed from for-treatment water containing the fluorine content and the nitrogen compounds, such as hydrofluoric acid waste water discharged from the semiconductor plant. Moreover, the for-treatment water from which the fluorine content has been removed and which contains at least the nitrogen compounds can be treated in the electrolysis treatment unit 3 and the biological treatment unit 4.

In consequence, the waste water containing the fluorine content and at least the nitrogen compounds discharged from the plant or the like can be treated into the state suitable for the environment. The cost of the waste water treatment can be reduced, and the adaptability to the environment can be improved.

Moreover, as to the for-treatment water, the water treated by the electrochemical technique is biologically treated. Therefore, as compared with a case where the water is treated by the only electrochemical technique, the running cost can remarkably be reduced, and the treatment efficiency of the for-treatment water can be enhanced.

It is to be noted that in the present embodiment, the treatment of the for-treatment water containing the fluorine content has been described as the example, and the fluorine content removing unit 2 is disposed. In a case where the for-treatment water does not have to be subjected to the treatment of the fluorine content, the water may be treated by the water treatment device 1 excluding the fluorine content removing unit 2. In this case, the for-treatment water containing the highly concentrated nitrogen compounds can efficiently be treated.

Furthermore, in the present embodiment, the fluorine content removing unit 2, the electrolysis treatment unit 3 and the biological treatment unit 4 are installed in this order, and the for-treatment water is treated by the units. However, the order of the treatments of the units is not limited to this order. Even if the order is changed, the for-treatment water can be treated.

What is claimed is:

1. A water treatment device comprising:
a fluorine content removing unit to separate a substance to be removed from for-treatment water in which the substance to be removed including a fluorine content is mixed;
an electrochemical treatment unit in which at least a pair of electrodes is submerged at least partially in the for-treatment water to perform a treatment by an electrochemical technique; and
a biological treatment unit which biologically treats the for-treatment water.

2. A water treatment devices comprising:
an electrochemical treatment unit in which at least one pair of electrodes is submerged at least partially in for-treatment water to perform a treatment by an electrochemical technique;
a biological treatment unit having a plurality of biological treatment tanks biologically treating the for-treatment water treated by the electrochemical technique;
a measuring unit measuring a concentration of nitric acid; and
a sensing unit sensing a level of the for-treatment water, wherein an amount of the plurality of the biological treatment tanks depends on the measured concentration of nitric acid in the for-treatment water and/or sensed level of the for-treatment water.

3. The water treatment device according to claim 1 or 2, the electrochemical treatment unit further comprising:
- a pH adjustment unit adjusting a pH of the for-treatment water during the treatment by the electrochemical technique;
- a pH detection unit detecting the pH of the for-treatment water; an ORP detection unit detecting an oxidation reduction potential of the for-treatment water;
- an end judgment unit judging an end of the treatment by the electrochemical technique and communicating with the pH detection unit and the ORP detection unit; and
- a control unit controlling conduction of electricity to the at least one pair of electrodes and communicating with the pH detection unit and the ORP detection unit,
- wherein the pH adjusting unit adjusts the pH of the for-treatment water to a predetermined range during the treatment by the electrochemical technique,
- the end judgment unit judges the end based on a detection output of the pH detection unit and/or an detection output of the ORP detection unit, and
- the control unit stops the conduction of electricity to the at least one pair of electrodes in response to the detection output of the pH detection unit and/or the ORP detection unit.

4. The water treatment device according to claim 3, electrochemical treatment unit further comprising:
- a hypohalogenous acid reduction treatment unit reducing hypohalogenous acid in the for-treatment water; and
- a reduction treatment end judgment unit judging the end of a reduction treatment of the hypohalogenous acid,
- wherein after the control unit stops the conduction of electricity to the at least one pair of electrodes,
- the hypohalogenous acid reduction treatment unit performs the reduction treatment of the hypohalogenous acid, and
- the reduction treatment end judgment unit judges the end of the reduction treatment to end an operation of the hypohalogenous acid reduction treatment unit, depending on the detection output of the ORP detection unit that is not more than a predetermined value.

5. The water treatment device according to claim 3, wherein the pH adjustment adjusts the pH of the for-treatment water into a range of 5 to 8.

6. The water treatment device according to claims 1 or 2, further comprising:
- an oxygen removal unit for removing oxygen from the for-treatment water before the biological treatment unit treats the for-treatment water.

7. The water treatment device according to claims 1 or 2, wherein the biological treatment unit treats the for-treatment water by use of granular sludge.

8. The water treatment device according to claim 1, further comprising:
- a biological treatment tank treating the for-treatment water with granular sludge, and having a filter membrane therein filtering the for-treatment water.

* * * * *